United States Patent
Peel et al.

(10) Patent No.: US 12,317,884 B2
(45) Date of Patent: *Jun. 3, 2025

(54) MOUNT ACCESSORY

(71) Applicant: Tactacam LLC, Caledonia, MN (US)

(72) Inventors: Jeff Peel, Decorah, IA (US); Garrison Peel, Caledonia, MN (US)

(73) Assignee: MAXVIEW HOLDINGS, LLC, Frankenmuth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,995

(22) Filed: Jun. 2, 2023

(65) Prior Publication Data

US 2023/0389538 A1 Dec. 7, 2023

Related U.S. Application Data

(63) Continuation of application No. 16/389,141, filed on Apr. 19, 2019, now Pat. No. 11,678,656.

(60) Provisional application No. 62/659,945, filed on Apr. 19, 2018.

(51) Int. Cl.
*A01M 31/06* (2006.01)
(52) U.S. Cl.
CPC .................................. *A01M 31/06* (2013.01)
(58) Field of Classification Search
None
See application file for complete search history.

(56) References Cited

U.S. PATENT DOCUMENTS

| 5,142,833 | A | 9/1992 | Svehaug |
| 5,813,160 | A | 9/1998 | Thoelke |
| 2002/0069904 | A1 | 6/2002 | Robinson |
| 2003/0106253 | A1 | 6/2003 | Loughman |
| 2005/0109891 | A1* | 5/2005 | McCuskey .............. F41A 23/18 248/122.1 |
| 2007/0119490 | A1 | 5/2007 | Reddick et al. |
| 2009/0107026 | A1 | 4/2009 | Wyant |
| 2009/0282722 | A1* | 11/2009 | Hoffmann ............. A01M 31/00 43/1 |
| 2012/0042561 | A1 | 2/2012 | Bain |
| 2012/0119044 | A1 | 5/2012 | Wilson |
| 2012/0211043 | A1* | 8/2012 | Mulligan ................ E04H 15/04 135/143 |
| 2013/0019514 | A1 | 1/2013 | Saringer et al. |
| 2014/0321909 | A1 | 10/2014 | Bain |
| 2015/0250162 | A1 | 9/2015 | Wyant |
| 2016/0198701 | A1 | 7/2016 | Bartel |
| 2017/0176125 | A1 | 6/2017 | Pauley |

(Continued)

OTHER PUBLICATIONS

NPI TR (Screen captures from YouTube video clip entitled "Turkey Reapers Season 1 Episode 2—Jeremy McCarty reaps another Iowa long Beard", 2 pages, uploaded Apr. 29, 2016 by user "Chasin The Rut and Turkey Reapers". Retrieved from Internet < https://www.youtube.com/watch?v=NCcsNn08F74 >) (Year: 2016).

(Continued)

*Primary Examiner* — Peter M Poon
*Assistant Examiner* — Carly W. Lynch
(74) *Attorney, Agent, or Firm* — Fredrikson & Byron, P.A.

(57) ABSTRACT

Systems, devices, and methods for providing a decoy are disclosed. In some embodiments, the decoy is attached to a weapon via a universal mount assembly.

15 Claims, 9 Drawing Sheets

(56) References Cited

U.S. PATENT DOCUMENTS

2019/0320647 A1* 10/2019 Peel .................. A01M 31/06

OTHER PUBLICATIONS

Mojo 1 (https://www.mackspw.com/Mojo-Tail-Chaser-MAX-Turkey-Decoy?gclid=EAlalQobChMI2uaYtdra7wIVAYTIChOrxgWIEAQYBSABEgLRzvD_BWE, Jul. 2017) (Year: 2017).
Mojo 2 (https://lwww.mojooutdoors.com/products/mojo-tail-chaser-max, Apr. 2018) (Year: 2018).
Jakefan (https://web.archive.org/web/20180331052950/hllps://killergear.com/producl/jakefan/, Mar. 2018) (Year: 2018).

* cited by examiner

MOUNT ACCESSORY

RELATED APPLICATIONS/INCORPORATION BY REFERENCE

The present application is a continuation of U.S. application Ser. No. 16/389,141, filed Apr. 19, 2019, which claims benefit from and priority to U.S. Application No. 62/659,945, filed Apr. 19, 2018, the contents of the above-identified applications are hereby incorporated herein by reference in their entirety.

BACKGROUND

Hunters often use decoys to lure an animal. For example, with turkeys, a hunter may use a turkey decoy of a tom. In some instances, the turkey decoy can be planted in the ground and the hunter can hide remotely from the planted decoy and wait for turkeys to be attracted to the decoy. In other instances, the turkey decoy can be planted in the ground with the hunter hidden behind the decoy.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Systems, devices, and methods for providing a decoy and/or a mount accessory for use with a decoy are provided substantially as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION OF THE DISCLOSURE

Figure 1:
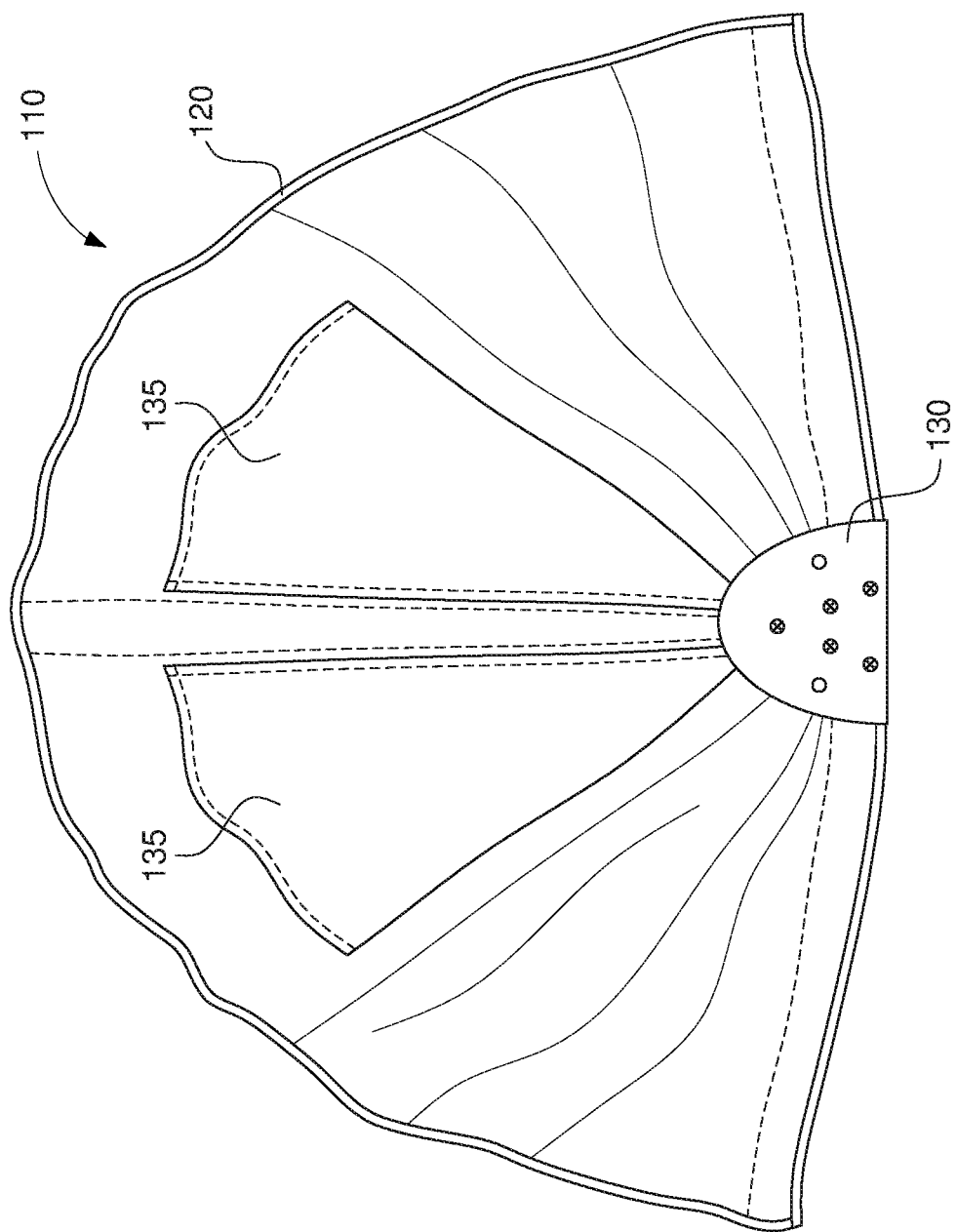
FIG. 1 shows a back side of an embodiment of a fan assembly according to the present disclosure.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments of the present disclosure relate to systems, methods, and devices that provide a decoy and/or a mount accessory for use with a decoy. In some embodiments, the decoy is attached to a weapon or some other device via a universal mount assembly.

Some embodiments of the present disclosure provide that the universal mount assembly can be used to attach different types of weapons such as, for example, a rifle, a gun, a bow, a crossbow, etc. Some embodiments of the present disclosure provide that the universal mount assembly can be used to attach different types of devices or apparatuses such as, for example, a camera, binoculars, a scope, a telescope, etc.

Hunters often use decoys to lure an animal. For example, with turkeys, a hunter may use a turkey decoy of a tom. In some instances, the turkey decoy can be planted in the ground and the hunter can hide remotely from the planted decoy and wait for turkeys to be attracted to the decoy. However, the turkeys that are attracted to the planted decoy might not come close enough to the remotely hidden hunter. In other instances, the turkey decoy can be planted in the ground with the hunter hidden behind the decoy. However, such a configuration lacks mobility and the hunter might need to expose himself to target the turkeys attracted to the planted decoy.

Some embodiments of the present disclosure overcome one or more of the noted problems with respect to decoys.

Some embodiments of the present disclosure provide a decoy (e.g., a turkey decoy) that attaches to a weapon (e.g., a bow, crossbow, firearm, etc.) and/or other device (e.g., handheld device, camera, scope, etc.) via a mount assembly (e.g., a universal mount assembly).

Some embodiments of the present disclosure provide a decoy with openings (e.g., adjustable and/or configurable openings) through which a portion of a weapon and/or a device can extend. In the case of a weapon, the hunter can shoot the weapon without damaging the decoy.

Some embodiments of the present disclosure provide a decoy that includes a universal mount assembly that can be used to attach different types of weapons to the decoy. The universal mount assembly can be adjusted for the height of the user (e.g., the hunter, viewer, etc.). Further, the universal mount assembly can be adjusted for right-handed or left-handed users. Such adjustments provide that the weapon (e.g., firearm) can extend through the decoy while being held in a comfortable position by the hunter as the hunter crouches behind the decoy, for example.

Figure 2:
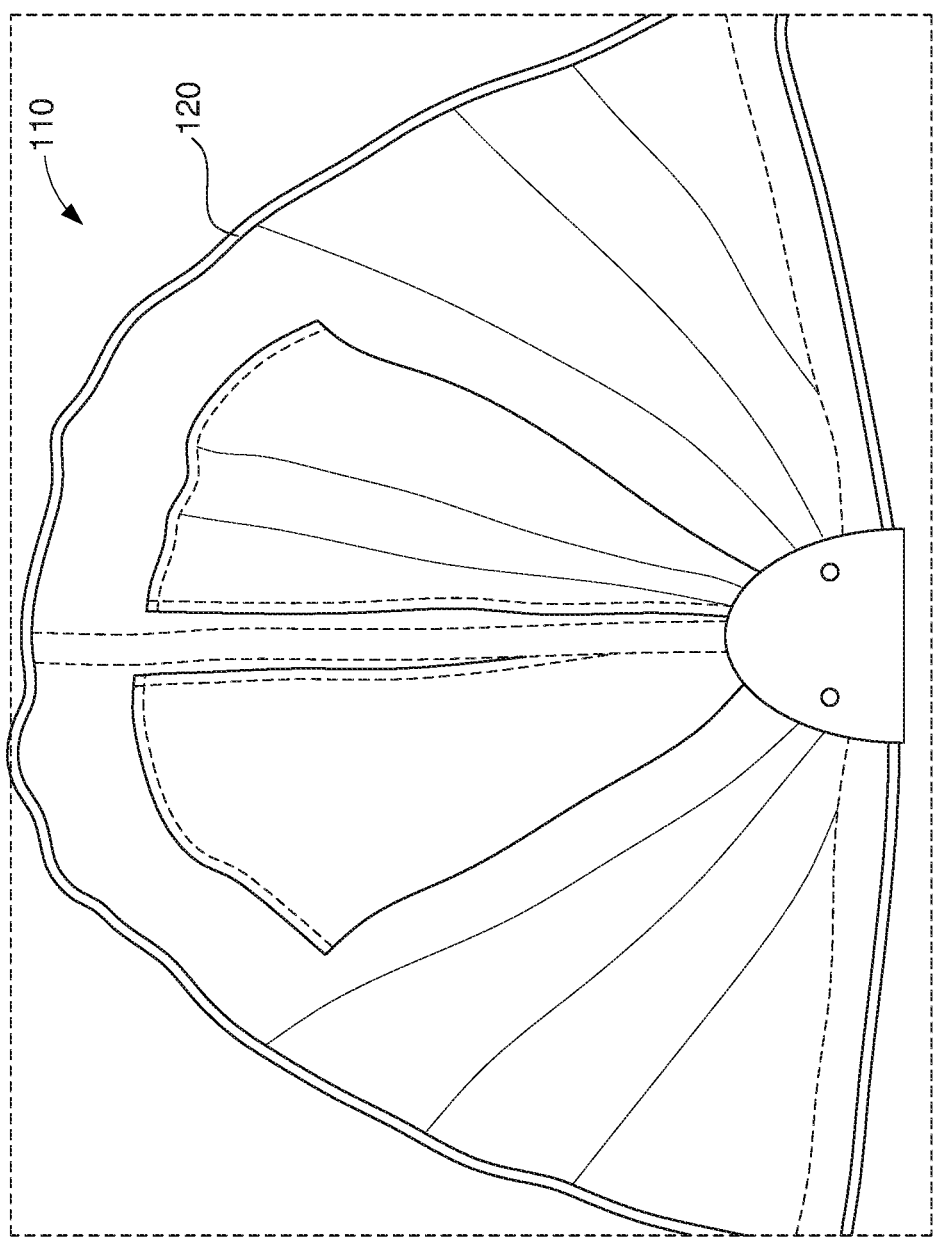
FIG. 2 shows a front side of an embodiment of a fan assembly according to the present disclosure.
Figure 4:
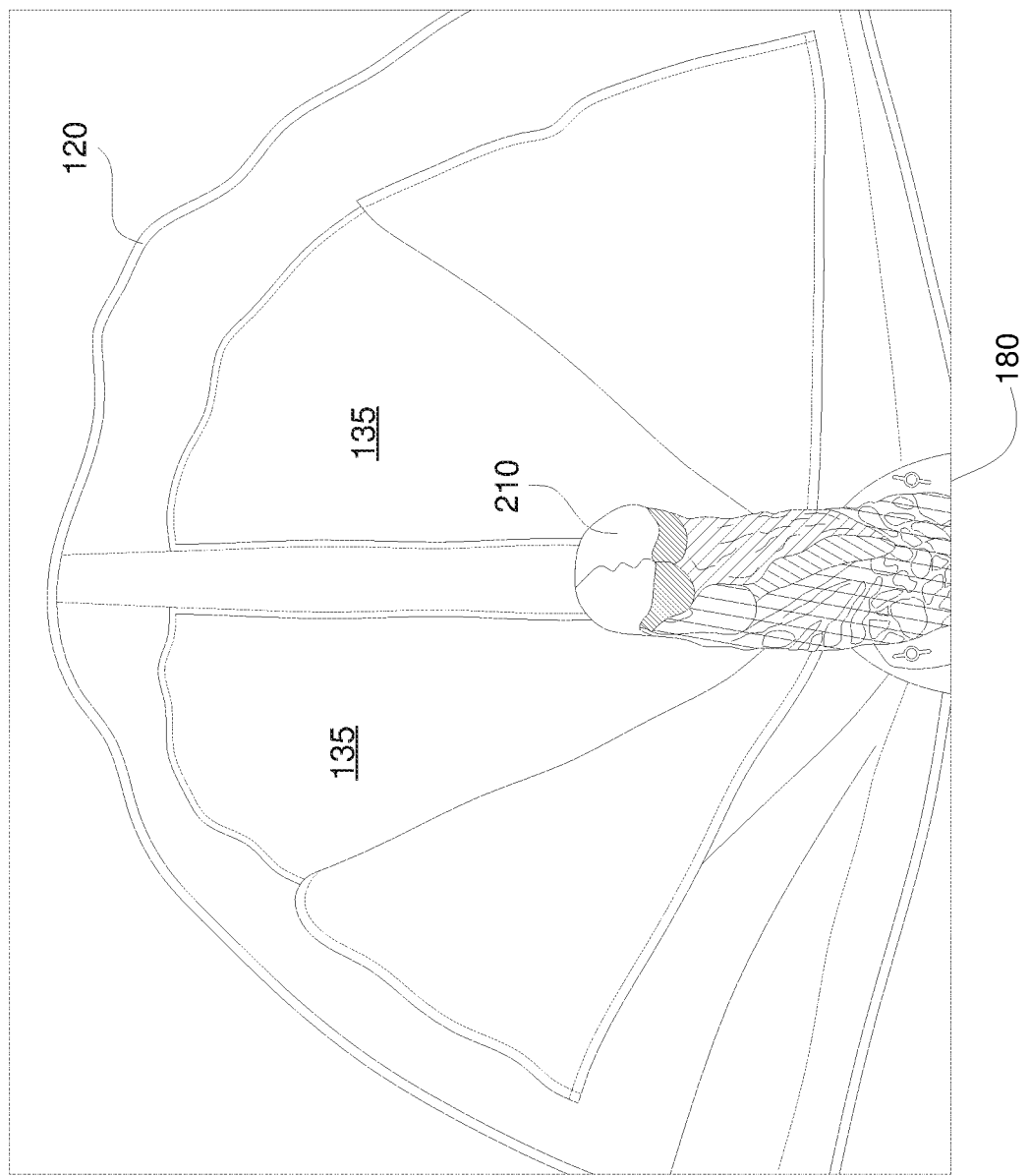
FIG. 4 shows an embodiment of a decoy with windows opened in the fan assembly according to the present disclosure.
Figure 5:
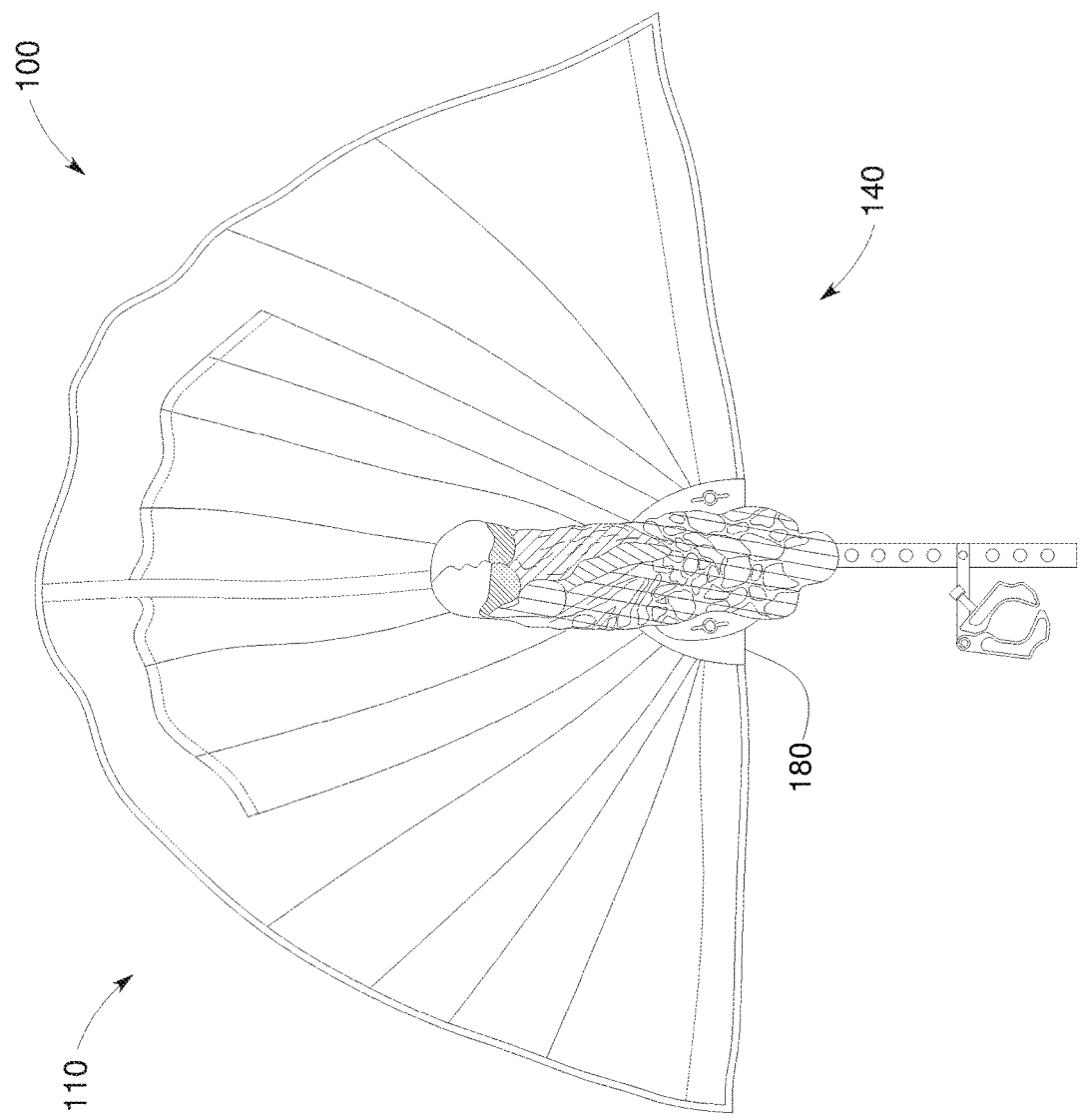
FIG. 5 shows an embodiment of a decoy according to the present disclosure.

FIGS. 1 and 2 show a back side and a front side, respectively, of an embodiment of a fan assembly according to the present disclosure. The fan assembly 110 of a decoy 100 can include, for example, a fan 120 (e.g., a turkey fan) and a bracket 130. The fan 120 can be made, at least in part, of synthetic materials. In some embodiments, the fan 120 can be made, at least in part, from a real turkey fan, for example. The fan 120 is held in place by the bracket 130. The fan 120 can also have windows 135 that can be opened and adjusted for a scope and/or a weapon. In some embodiments, the windows 135 on the fan 120 can be adjusted in size to provide for arrow clearance and/or for use by a scope or sight on archery equipment. Windows 135 can be opened on the right and/or left side of the fan 120 depending upon the preference (e.g., right-handed or left-handed) of the user as shown in FIG. 4. In some embodiments, the windows 135 can be opened or closed, and/or adjusted in size via fastening mechanisms such as zippers, hook-and-look fasteners (e.g., Velcro fasteners), magnets, bolts, adhesive, etc. The size of the opening of the window 135 can be adjusted, for example, to allow clearance, yet still keep the user hidden behind the fan 120.

In some embodiments, the windows 135 on the fan 120 can be adjusted in size the window 135 through the fan 120 to allow for arrow clearance and use of the sights on archery equipment. The window 135 is placed on the left and right side of the fan to allow multiple adjustments to accommodate any shooter. While multiple means exist for securing and adjusting the windows 135, the attached pictures use Velcro to set the size of the opening to allow clearance yet still keep the shooter hidden behind the fan.

Figure 3:
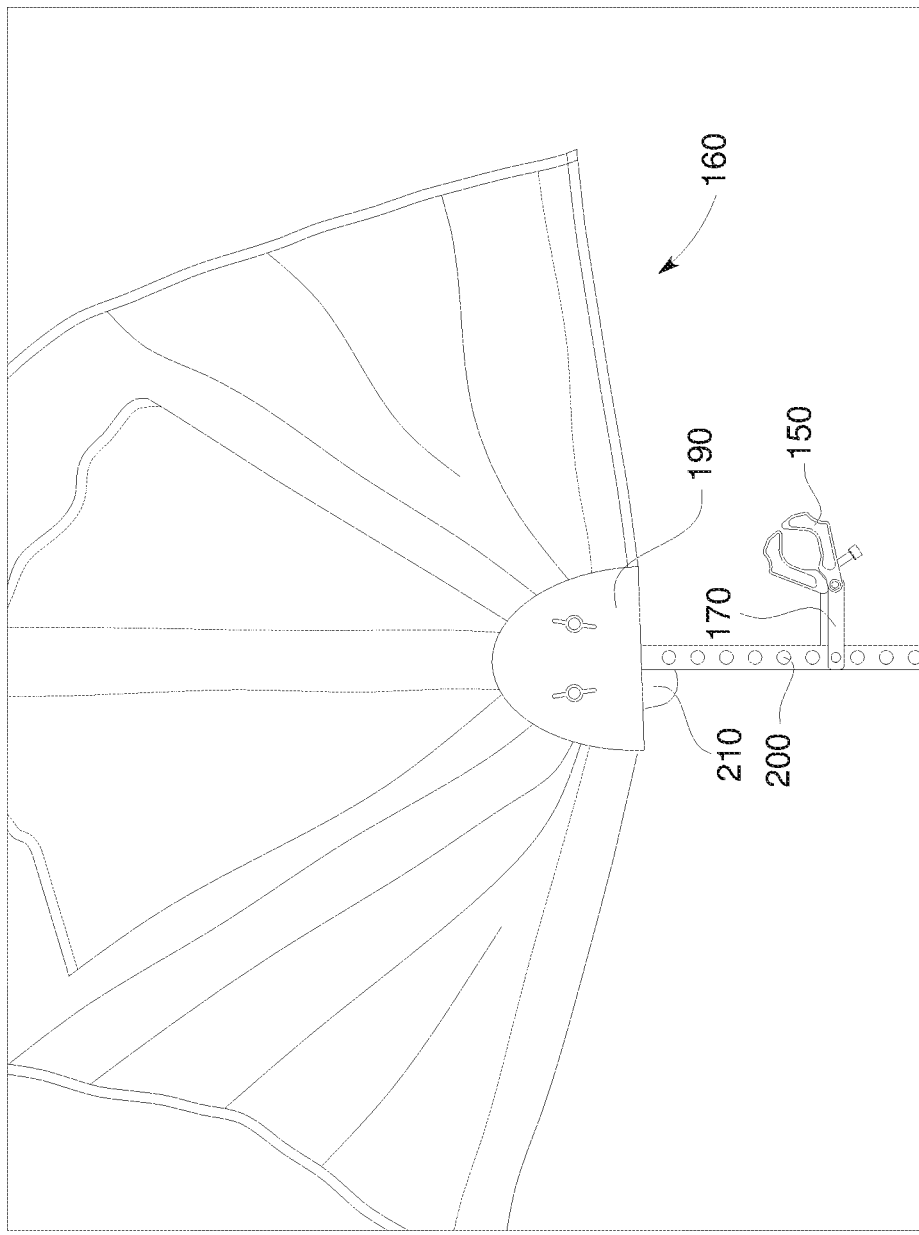
FIG. 3 shows a back side of an embodiment of a universal mount assembly according to the present disclosure.

Some embodiments provide that the decoy 100 employ a universal mount assembly 140 according the present disclosure. The universal mount assembly 140 can include, for example, a clamp-style attachment 150 mounted to a fan press 160 as shown in FIG. 3.

FIGS. 3, 5, and 7-9 show an embodiment of the universal mount assembly 140 according to the present disclosure. The clamp-style attachment 150 (e.g., claw-style attachment) is capable of expanding and contracting (e.g., opening and closing) to clamp or release a weapon (e.g., a gun barrel, a bow stabilizer, a weapon scope, etc.). It has a swing arm 170 (e.g., a pivot arm) that allows the user to adjust which side (e.g., right side or left side) that the clamp-style attachment 150 is disposed. The swing arm 170 can also be adjusted to any angle with respect to fan press 160 to which it is attached. The swing arm 170 also provides adjustments that allow weapon sights (e.g., bow sights, gun sights, etc.) to be clear for accurate shooting. The jaws of the clamp-style attachment 150 can pivot on a single rivet to allow the mount to tighten smoothly and to provide additional degrees of freedom with respect to mounting the weapon with respect to the swing arm 170 and/or the fan press 160. The other end of the swing arm 170 attaches to the fan press 160. In some embodiments, the swing arm 170 and/or the jaws of the clamp-style attachment 150 can pivot left to right and/or front to back to provide additional degrees of freedom for adjustments.

Figure 6:
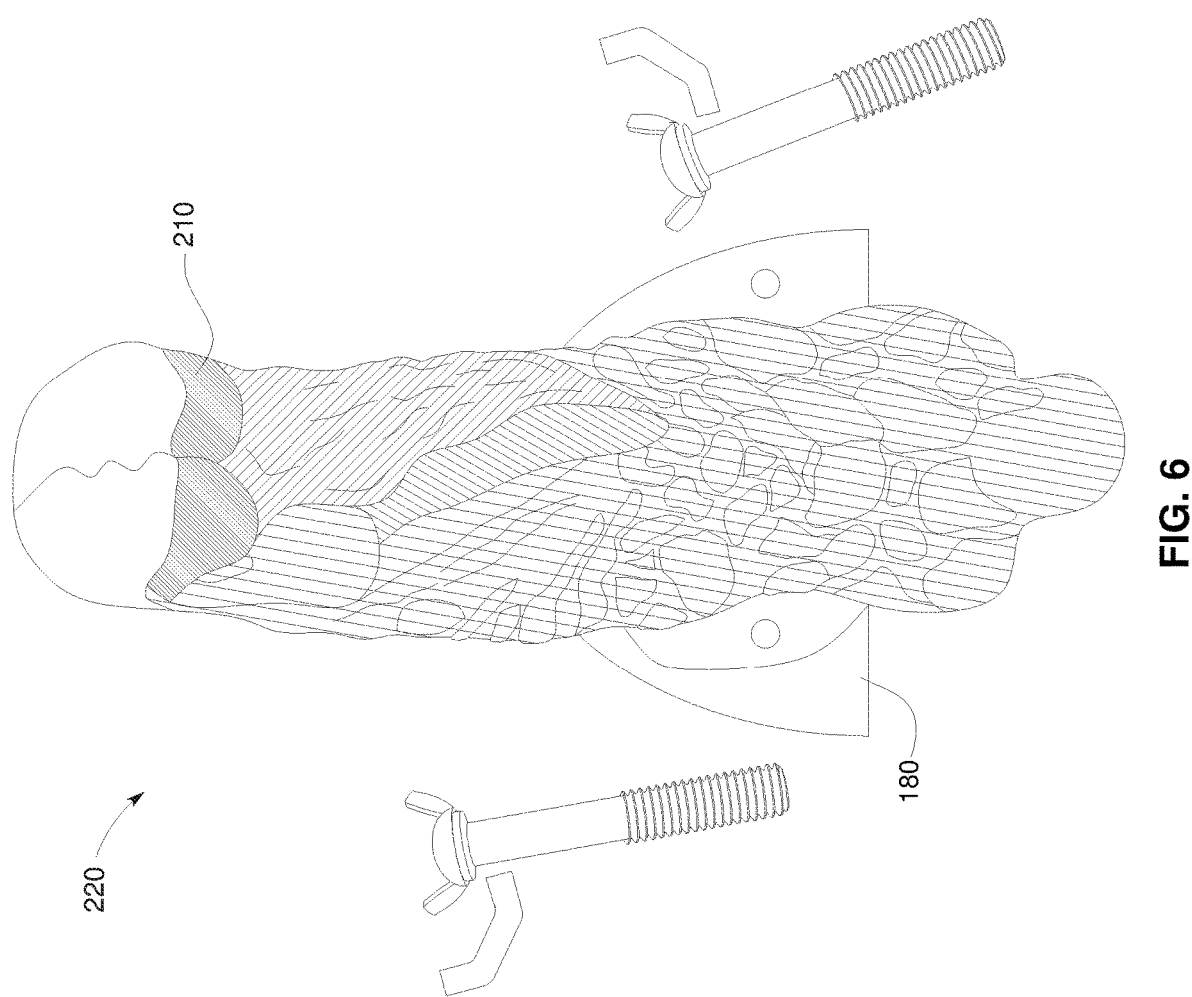
FIG. 6 shows an embodiment of a decoy head assembly according to the present disclosure.
Figure 7:
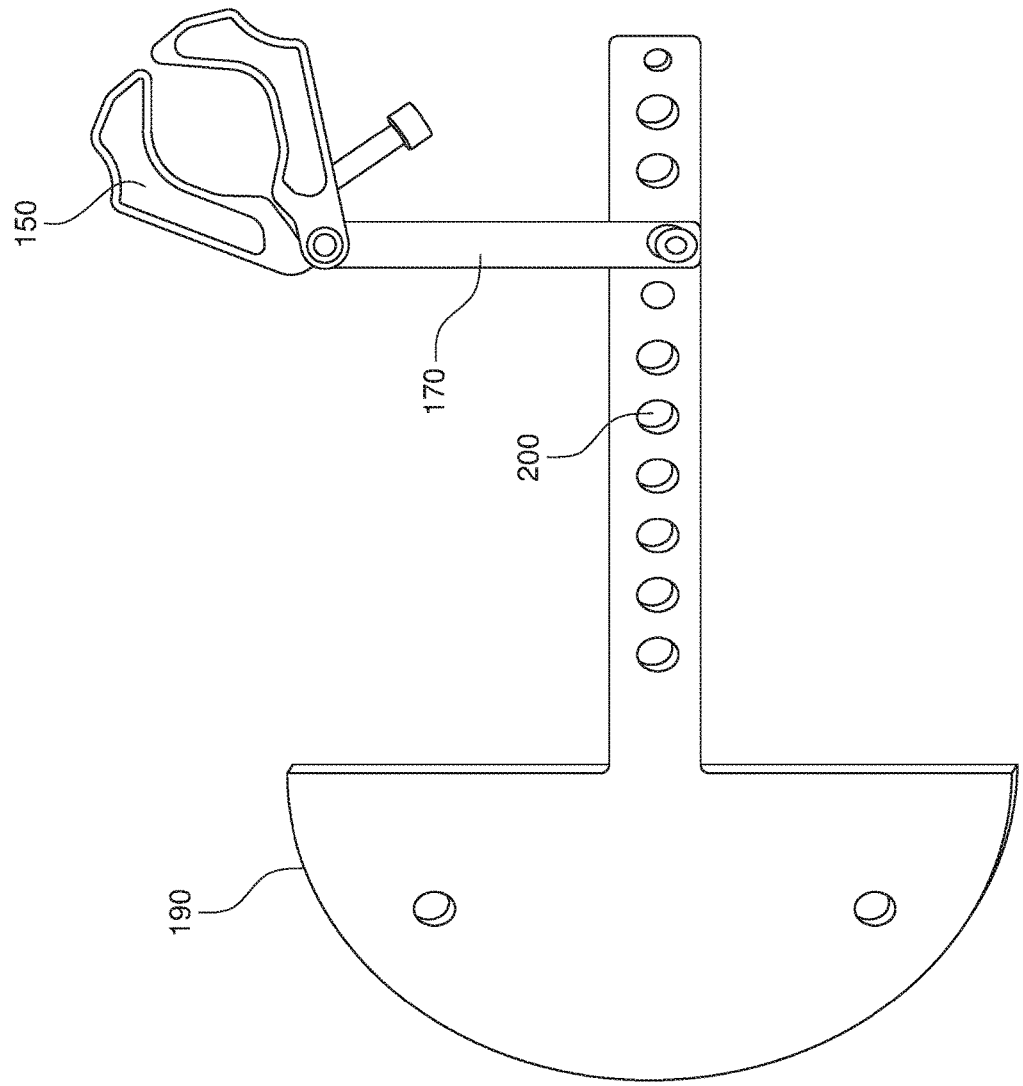
FIG. 7 shows an embodiment of a universal mount assembly according to the present disclosure.
Figure 8:
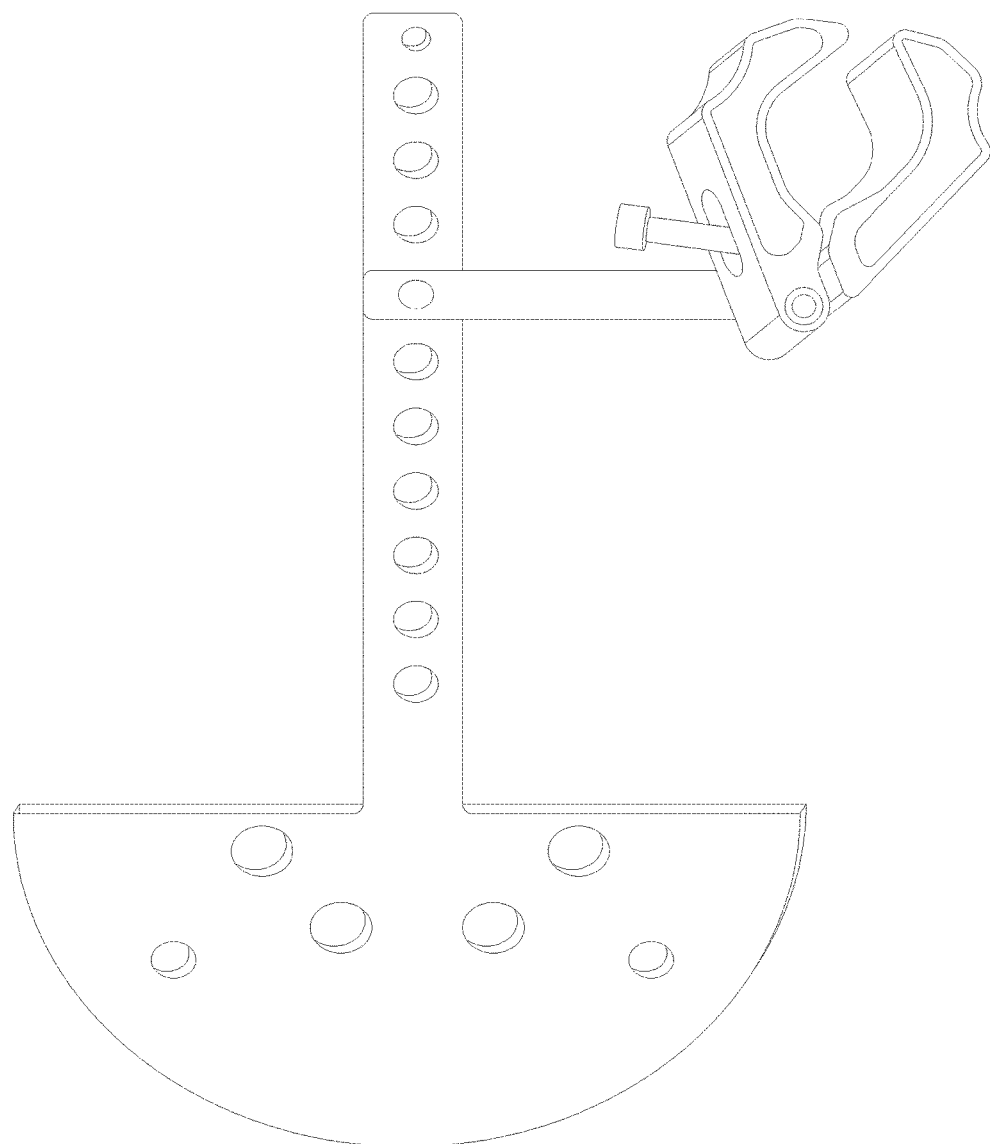
FIG. 8 shows an embodiment of a universal mount assembly according to the present disclosure.
Figure 9:
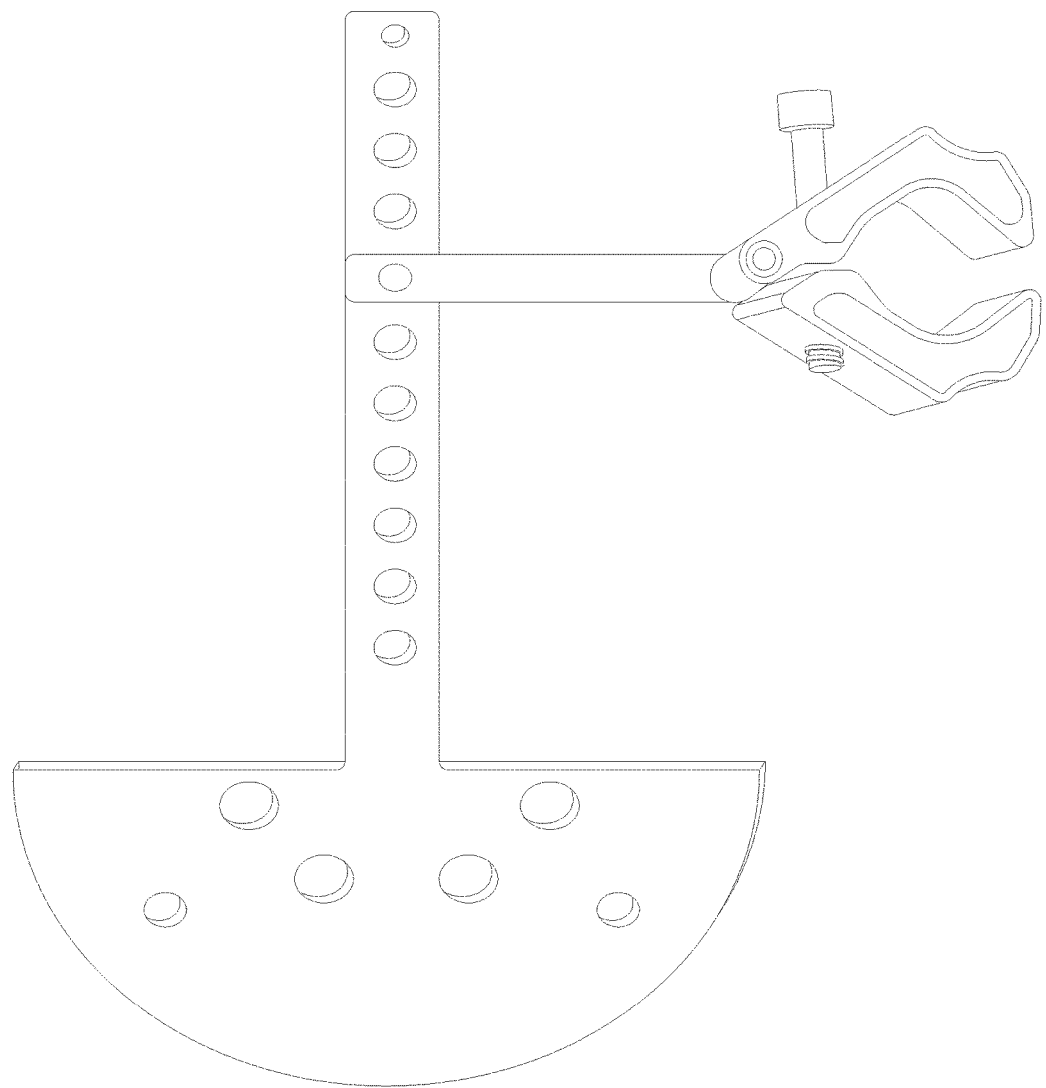
FIG. 9 an embodiment of a universal mount assembly according to the present disclosure.

Some embodiments provide that the fan press 160 (e.g., an adjustable fan press) includes a front bracket 180 and a back bracket 190 according to the present disclosure. The front bracket 180 and the back bracket 190 can be screwed together to mount to the bracket 130 of the fan assembly 110. The back bracket 190 extends into a shaft 200. Referring to FIGS. 3, 5, and 7-9, the shaft 200 is structured for adjusting the height of the fan press 160 with respect to the attached clamp-style attachment 150. The height adjustment can be useful, for example, to accommodate the sighting system of a weapon. In some embodiments, the front bracket 180 can also accommodate the head 210 of the decoy (e.g., a head of a turkey decoy) in which the screws used to secure the head 210 to the fan press 160 also secure the front bracket 180 to the fan assembly bracket 130 and the back bracket 190. FIG. 6 shows an embodiment of head assembly 220 according to the present disclosure. In some embodiments, the shaft 200 can be structured to receive a ground spike so that the decoy can be planted into the ground.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A decoy, comprising:
   a fan comprising a fan front side, a fan back side, a left window opening through a left side portion of the fan front side, a left window covering configured to selectively cover the left window opening, a right window opening through a right side portion of the fan front side, and a right window covering configured to selectively cover the right window opening; and
   a mount assembly coupled to the fan, wherein the mount assembly comprises a clamp coupled to the fan via a shaft, wherein the clamp is configured to secure the fan to a weapon;
   wherein the shaft comprises an upper portion, a lower portion, a longitudinal surface between an upper end and a lower end of the shaft, and a plurality of holes through the longitudinal surface;
   wherein the mount assembly comprises an arm and a fastener that attach the clamp to the shaft at a selectable height along the shaft;
   wherein the fastener passes through a proximal portion of the arm and a hole selected from the plurality of holes through the longitudinal surface of the shaft; and
   wherein the clamp is attached to a distal portion of the arm.

2. The decoy of claim 1, wherein:
   the left window covering covers the left window opening when placed in a closed position and exposes the left window opening when placed in an opened position; and
   the right window covering covers the right window opening when placed in a closed position and exposes the right window opening when placed in an opened position.

3. The decoy of claim 2, wherein the left window covering and the right window covering are independently movable between their respective opened position and closed position.

4. The decoy of claim 1, further comprising one or more zippers that permit securing the left window covering and the right window covering in a respective partially-opened position.

5. The decoy of claim 1, further comprising one or more hook-and-loop fasteners that permit securing the left window covering and the right window covering in a respective partially-opened position.

6. The decoy of claim 1, comprising a decoy head coupled to the fan front side.

7. The decoy of claim 1, wherein the fastener provides a pivot axis that is coaxial with a longitudinal axis of the fastener and perpendicular to the longitudinal surface of the shaft and permits the clamp via the arm to pivot around the pivot axis.

8. The decoy of claim 7, wherein the pivot axis provided by the fastener permits the arm to pivot between at least a left side position in which the fan is positioned toward a left side of the shaft and a right side position in which the fan is positioned toward a right side of the shaft.

9. A decoy, comprising:
- a fan comprising a fan front side, a fan back side, a left window opening through a left side portion of the fan front side, a left window covering configured to selectively cover the left window opening, a right window opening through a right side portion of the fan front side, and a right window covering configured to selectively cover the right window opening; and
- a mount assembly coupled to the fan, wherein the mount assembly comprises a clamp coupled to the fan via a shaft, wherein the clamp is configured to secure the fan to a weapon;
- wherein the shaft comprises an upper portion, a lower portion, a longitudinal surface between an upper end and a lower end of the shaft, and a plurality of holes through the longitudinal surface;
- wherein the mount assembly comprises an arm and a fastener that attach the clamp to the shaft at a selectable height along the shaft; and
- wherein the fastener provides a pivot axis that is coaxial with a longitudinal axis of the fastener and perpendicular to the longitudinal surface of the shaft and permits the clamp via the arm to pivot around the pivot axis.

10. The decoy of claim 9, wherein the pivot axis provided by the fastener permits the arm to pivot between at least a left side position in which the fan is positioned toward a left side of the shaft and a right side position in which the fan is positioned toward a right side of the shaft.

11. The decoy of claim 9, wherein:
- the left window covering covers the left window opening when placed in a closed position and exposes the left window opening when placed in an opened position; and
- the right window covering covers the right window opening when placed in a closed position and exposes the right window opening when placed in an opened position.

12. The decoy of claim 11, wherein the left window covering and the right window covering are independently movable between their respective opened position and closed position.

13. The decoy of claim 9, further comprising one or more zippers that permit securing the left window covering and the right window covering in a respective partially-opened position.

14. The decoy of claim 9, further comprising one or more hook-and-loop fasteners that permit securing the left window covering and the right window covering in a respective partially-opened position.

15. The decoy of claim 9, comprising a decoy head coupled to the fan front side.

* * * * *